United States Patent
Mochizuki et al.

(10) Patent No.: US 9,568,045 B2
(45) Date of Patent: Feb. 14, 2017

(54) SUPPORT AND GUIDE DEVICE

(71) Applicant: THK CO., LTD., Tokyo (JP)

(72) Inventors: Hiroaki Mochizuki, Tokyo (JP);
Hiroomi Kuribayashi, Tokyo (JP);
Akito Kaneko, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 14/769,933

(22) PCT Filed: Feb. 6, 2014

(86) PCT No.: PCT/JP2014/052722
§ 371 (c)(1),
(2) Date: Aug. 24, 2015

(87) PCT Pub. No.: WO2014/148135
PCT Pub. Date: Sep. 25, 2014

(65) Prior Publication Data
US 2016/0003295 A1     Jan. 7, 2016

(30) Foreign Application Priority Data

Mar. 21, 2013    (JP) .................................. 2013-058718

(51) Int. Cl.
    *F16C 29/06*       (2006.01)
    *F16C 29/00*       (2006.01)
    *B66B 9/08*        (2006.01)

(52) U.S. Cl.
CPC ......... *F16C 29/0614* (2013.01); *F16C 29/005* (2013.01); *F16C 29/063* (2013.01); *B66B 9/0846* (2013.01)

(58) Field of Classification Search
CPC ... F16C 29/005; F16C 29/0614; F16C 29/063; B66B 9/0846
(Continued)

(56) References Cited

U.S. PATENT DOCUMENTS

| | | | | |
|---|---|---|---|---|
| 5,123,357 A | * | 6/1992 | Fujita | B60L 13/03 104/290 |
| 2002/0028030 A1 | * | 3/2002 | Michioka | F16C 19/362 384/45 |
| 2002/0042303 A1 | * | 4/2002 | Larson | A63G 7/00 472/44 |

FOREIGN PATENT DOCUMENTS

| | | | | |
|---|---|---|---|---|
| GB | 1393669 A | * | 5/1975 | ............. B66B 9/003 |
| JP | 62-056660 A | | 3/1987 | |

(Continued)

OTHER PUBLICATIONS

International Search Report dated Apr. 28, 2014, issued in counterpart application No. PCT/JP2014/052722 (2 pages).

*Primary Examiner* — Marcus Charles
(74) *Attorney, Agent, or Firm* — Westerman, Hattori, Daniels & Adrian, LLP

(57) ABSTRACT

A support and guide device capable of smoothly shifting a moving block configured to move along a guide track from one of a plurality of track rails forming the guide track to another of the plurality of track rails even when clearances are secured at joints between the plurality of track rails. Each of the track rails has auxiliary sliding surfaces formed on both end portions of the each of the plurality of track rails in the longitudinal direction, the auxiliary sliding surfaces formed side by side with a guide surface and being inclined with respect to the guide surface. The moving block includes leading sliding portions each configured to face one of the auxiliary sliding surfaces of the track rail when the moving block reaches one of both end portions of the track rail in the longitudinal direction.

7 Claims, 8 Drawing Sheets

(58) Field of Classification Search
USPC .............................. 384/43–45, 49, 55, 57, 59
See application file for complete search history.

(56) References Cited

FOREIGN PATENT DOCUMENTS

| | | | |
|---|---|---|---|
| JP | 2000-46052 A | | 2/2000 |
| JP | 2000120684 A | * | 4/2000 |
| JP | 2005233247 A | * | 9/2005 |
| JP | 2006-80260 A | | 3/2006 |
| JP | 2007-205479 A | | 8/2007 |
| JP | 2007270896 A | * | 10/2007 |
| JP | 2008-39041 A | | 2/2008 |
| JP | 2010-261483 A | | 11/2010 |
| KR | 20030070180 A | * | 8/2003 |
| WO | 2010/125895 A1 | | 11/2010 |

* cited by examiner

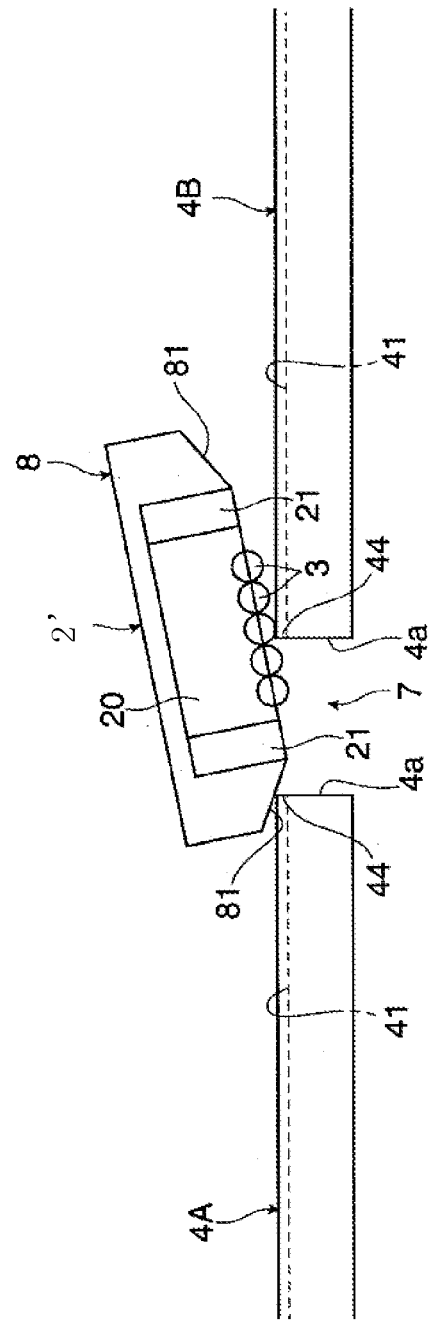

SUPPORT AND GUIDE DEVICE

TECHNICAL FIELD

The present invention relates to a support and guide device configured to guide a movable body such as tables and units to arbitrary positions along a given path while bearing a load of the movable body.

BACKGROUND ART

A linear motion guide apparatus as disclosed in Patent Literature 1 has been known as a related-art apparatus that is available as a support and guide device of this type. This linear motion guide apparatus includes track rails along which rolling surfaces for a large number of rolling elements are formed, and moving blocks mounted to those track rails through intermediation of the rolling elements. The rolling elements are configured to roll on the rolling surfaces of the track rails while bearing loads so that the moving blocks are freely movable along the track rails. Depending on a size or a weight of the movable body such as tables and units to be guided, in general, the track rails are arranged parallel to each other in two rows, and the plurality of moving blocks to be moved along those track rails are fixed to the movable body. With this, the movable body can be moved with high accuracy along the track rails.

This linear motion guide apparatus is utilized mainly for linear guide along an X-axis, a Y-axis, and a Z-axis in working machines so that objects-to-be-conveyed such as workpieces and tools are guided and positioned with high accuracy. Requests for guiding the objects-to-be-conveyed with high accuracy cannot necessarily be satisfied due to a limitation on a length of the track rails to be manufactured. Thus, when a moving distance necessary for the objects-to-be-conveyed is larger than a length of a single track rail, the plurality of track rails are coupled in series to each other without clearances so as to form guide tracks having a length corresponding to the moving distance of the objects-to-be-conveyed. With this configuration, the moving blocks are movable over an entire length of the guide tracks across joints between the track rails. Further, the rolling surfaces are formed through a collective grinding process so as to suppress height differences among the joints between the plurality of track rails to be arranged in series. In this way, dimensions are strictly managed. With this, the objects-to-be-conveyed can be guided with high accuracy along the guide tracks formed by coupling the plurality of track rails to each other.

CITATION LIST

Patent Literature

[PTL 1] JP 2000-46052 A

DISCLOSURE OF THE INVENTION

Problems to be Solved by the Invention

Meanwhile, the linear motion guide apparatus is not limited to such use as to guide or position the objects-to-be-processed with high accuracy as in the working machines, and may be utilized also for merely conveying the movable body such as tables and units. Specifically, long guide tracks can be formed by arranging the plurality of track rails in series, and hence the linear motion guide apparatus may be used to, for example, move various devices, interior equipment, and the like in a large space such as passenger cabins in aircrafts, ships, or trains so that those devices and interior equipment are arranged at arbitrary positions in the space.

In this context, large structures such as the aircraft and the ship are often manufactured by preparing a plurality of segments and lastly coupling those segments to each other, to thereby complete an intended large structure. In this case, in consideration of simplification of final assembly of the structure, it is inappropriate to fix the track rails while bridging over a coupling portion of the adjacent segments. Further, as for airliners, extensive interior furnishing of the passenger cabin is difficult to perform after completion of assembly of a fuselage. Thus, at the time of assembly of the fuselage, a plurality of fuselage segments are not welded to each other until a part of the interior furnishing, which is performed on each of the fuselage segments prior to the assembly of the fuselage, is progressed to some extent. Under the circumstances, in order to form long guide tracks in the large structure, it is appropriate to first fix the track rails to the segments, and then couple the segments to which the track rails are fixed, to thereby complete the long guide tracks in the large structure.

Thus, in consideration of the coupling of the segments, clearances need to be secured in advance between end portions of the track rails, which are opposed to each other across the coupling portions. Further, as for the large structures such as the aircraft, the train, and the ship, there is a risk in that the segments thereof are deformed differently from each other when an external force is applied to those structures. Thus, when the plurality of track rails forming the guide tracks are arrayed without securing the clearances between the end portions, there is another risk in that the end portions of the adjacent track rails significantly interfere with each other. Thus, also from such viewpoints, clearances may need to be secured in advance at joints between the adjacent track rails. Sizes of the clearances, which are differently set depending on a size of a structure in which the track rails are laid, may be set to approximately ten and several millimeters. Those dimensions are clearly larger than a diameter of each of the rolling elements of the above-mentioned linear motion guide apparatus.

In this way, in a case where the clearances are secured at the joints between the track rails forming the above-mentioned guide tracks, when the moving blocks reach the joints between the track rails, the rolling elements fail to come into contact with the rolling surfaces of the track rails, and enter a non-load state. As a result, the moving blocks cannot bear a load of the movable body, and may be significantly displaced from the track rails. As a result, the moving blocks may interfere with the end portions of the track rails located in a forward direction, and the movable body supported by the moving blocks may be hindered from being smoothly moved.

Note that, the linear motion guide apparatus disclosed in Patent Literature 1 is described as an example of the support and guide devices configured to guide the movable body to arbitrary positions along a given path, but the problems as described above may occur also in support and guide devices of such a type that the moving blocks configured to slide on the track rails each include low-friction sliding contact members, or such a type that the moving blocks configured to travel on the track rails each include pivotally supported wheels.

Means for Solving the Problems

The present invention has been made from such viewpoints, and it is therefore an object of the present invention to provide a support and guide device capable of smoothly shifting moving blocks configured to move along guide tracks from one of a plurality of track rails forming the guide tracks to another of the track rails even when clearances are secured at joints between the track rails.

In order to attain the above-mentioned object, according to one embodiment of the present invention, there is provided a support and guide device, including: a plurality of track rails arranged in series so as to form a guide track; and a moving block movable along the guide track while being sequentially shifted between the plurality of track rails, in which each of the plurality of track rails has a guide surface formed along a longitudinal direction of the each of the plurality of track rails. Further, the moving block includes contact elements configured to travel on the guide surface of the each of the plurality of track rails. The each of the plurality of track rails has auxiliary sliding surfaces formed on both end portions of the each of the plurality of track rails in the longitudinal direction, the auxiliary sliding surfaces being formed side by side with the guide surface and being inclined with respect to the guide surface. The moving block includes leading sliding portions each being configured to face one of the auxiliary sliding surfaces of the each of the plurality of track rails when the moving block reaches one of both the end portions of the each of the plurality of track rails in the longitudinal direction.

According to the one embodiment of the present invention configured as described above, at the time when the moving block is shifted between the plurality of track rails forming the guide track, the auxiliary sliding surfaces of each of the plurality of track rails and the leading sliding portions of the moving block cooperatively supports smooth shift of the moving block. Thus, also when the plurality of track rails and the moving block have an inverse relationship, the object of the present invention can be attained.

In other words, according to another embodiment of the present invention, it is conceivable that the moving block has auxiliary sliding surfaces formed on both end portions of the moving block in the longitudinal direction, which are inclined with respect to the guide surface of the each of the plurality of track rails, and that the each of the plurality of track rails include leading sliding portions each being configured to face one of the auxiliary sliding surfaces of the moving block when the moving block reaches one of both the end portions of the each of the plurality of track rails in the longitudinal direction.

Effects of the Invention

According to the support and guide device of the embodiments of the present invention configured as described above, the moving block or the track rail includes the auxiliary sliding surfaces that are inclined with respect to the guide surface of the track rail, and the auxiliary sliding surfaces are configured to face the leading sliding portions of the moving block or the track rail. Thus, in a case where clearances are secured at joints between the track rails forming the guide track, when the moving block is displaced from the track rails at the time of moving across the joint, the auxiliary sliding surface comes into sliding contact with the opposed leading sliding portion. As a result, the moving block can avoid interfering with the end portion of the track rail in the longitudinal direction, which is located in a forward direction. Thus, the moving block can be smoothly shifted between the end portions of the track rails in the longitudinal direction, which are arranged in series. With this, even when clearances need to be secured between the plurality of track rails forming the guide track, a movable body supported by the moving block can be smoothly guided along the guide track.

BRIEF DESCRIPTION OF THE DRAWINGS

FIG. 9 is a schematic view for exemplifying a state of a joint clearance in the support and guide device according to the third embodiment.

MODE FOR CARRYING OUT THE INVENTION

Now, with reference to the accompanying drawings, description is made of support and guide devices according to embodiments to which the present invention is applied.

Figure 1:
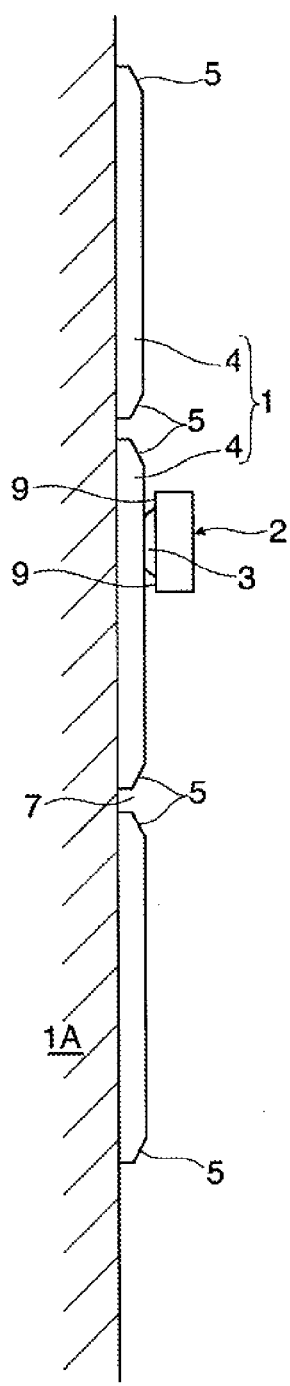
FIG. 1 is an explanatory schematic view for illustrating a basic structure of a support and guide device according to the present invention.

FIG. 1 is a schematic view for illustrating the support and guide device according to the present invention. This support and guide device includes a plurality of track rails 4 arranged in series on a fixed portion 1A such as a structure so as to form guide tracks 1, and a moving block 2 movable along the guide tracks 1 while being sequentially shifted from one to another of the plurality of track rails 4. Although not shown in FIG. 1, the track rails 4 each have a guide surface along its longitudinal direction, and the moving block 2 includes contact elements 3 configured to travel on the guide surfaces of the track rails 4. At the time of traveling on the guide surfaces, the contact elements 3 each bear a load. With this, the moving block 2 is freely movable to arbitrary positions on the guide tracks 1. As examples of the fixed portion 1A on which the track rails 4 are laid, there may be given wall surfaces and ceiling surfaces of passenger cabins in aircrafts, ships, or trains. A movable body (not shown) to be used at arbitrary positions in the passenger cabins, such as various units and tables, is fixed to the moving block 2. With this, the movable body can be guided to arbitrary positions on the guide tracks 1. Note that, the fixed portion 1A and the movable body are not limited to the above-mentioned examples.

At each end portion in the longitudinal direction of each of the track rails 4, auxiliary sliding surfaces 5 inclined with respect to a guide direction of the moving block 2 are formed. Further, the moving block 2 includes leading sliding portions 9 formed at positions of facing the auxiliary sliding surfaces 5. As illustrated in FIG. 1, the auxiliary sliding surfaces 5 effectively function when clearances 7 (hereinafter referred to as "joint clearances") are secured at joints between the plurality of track rails 4 arranged in series. Specifically, when the moving block 2 is displaced from the track rails 4 in the joint clearances 7 at the time of shift of the moving block 2 to subsequent track rails 4 located forward during advancement along the guide tracks 1, the leading sliding portions 9 of the moving block 2 come into sliding contact with the opposed auxiliary sliding surfaces 5. With this, the displacement of the moving block 2 from the track rails 4 are gradually eliminated, and hence the moving block 2 can be smoothly shifted between adjacent ones of the track rails 4.

Note that, FIG. 1 is a schematic view for illustrating the invention, in which the auxiliary sliding surfaces 5 of the track rails 4 are illustrated on an exaggerated scale.

Figure 2:
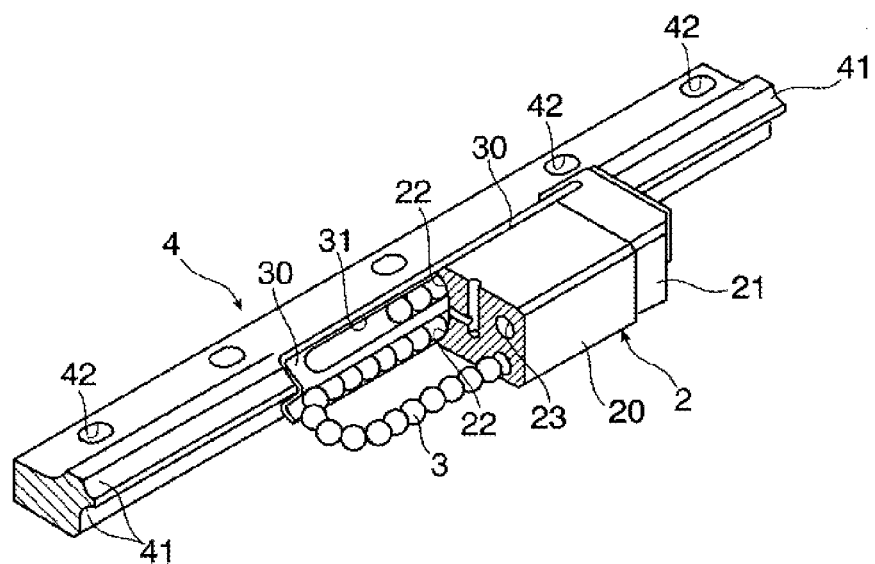
FIG. 2 is a perspective view for illustrating a combination of a moving block and a track rail of the support and guide device according to a first embodiment to which the present invention is applied.

FIG. 2 is a view for illustrating in more detail the support and guide device to which the present invention is applied, specifically, for illustrating a combination of the track rail 4 and the moving block 2 according to a first embodiment of the present invention.

The track rail 4 is a bar-like member having a substantially rectangular shape in cross-section, and is formed into a straight shape. On one lateral surface of the track rail 4, ball rolling surfaces 41 on which balls 3 roll are formed parallel to each other in two rows along the longitudinal direction of the track rail 4. Those ball rolling surfaces 41 correspond to guide surfaces of the support and guide device according to the present invention. Further, mounting holes 42 for fixing bolts are formed at predetermined intervals along the longitudinal direction of the track rail 4. Those mounting holes 42 are utilized at the time of laying the track rail 4 onto the fixed portion 1A.

Figure 3:
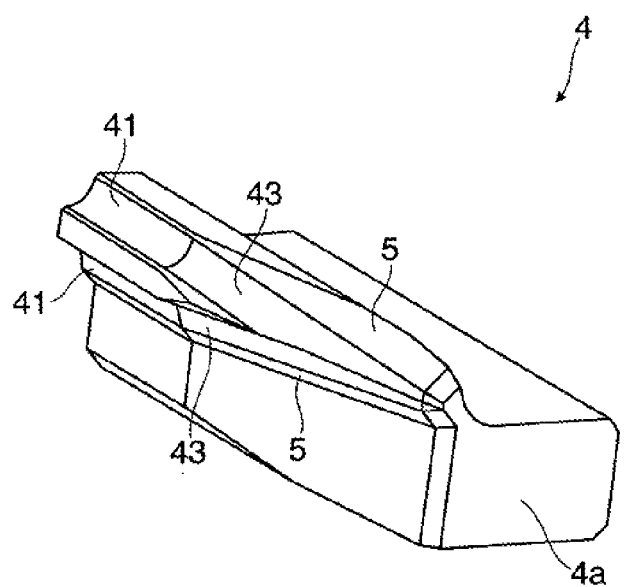
FIG. 3 is an enlarged perspective view for illustrating an end portion of the track rail in a longitudinal direction according to the first embodiment.

FIG. 3 is a view for illustrating one end of the track rail 4 in the longitudinal direction. At this end portion of the track rail 4 in the longitudinal direction, the auxiliary sliding surfaces 5 are formed side by side with the ball rolling surfaces 41 and at positions of facing the moving block 2. Specifically, in this embodiment, the auxiliary sliding surfaces 5 are formed at positions adjacent to the ball rolling surfaces 41, and the ball rolling surfaces 41 in two rows are formed parallel to each other on the track rail 4. Thus, two auxiliary sliding surfaces 5 are formed on each side in such a manner as to sandwich the ball rolling surfaces 41 in two rows from both sides. The auxiliary sliding surfaces 5 are formed over a predetermined distance from a longitudinal end surface 4a of the track rail 4 into such a shape that the end portion in the longitudinal direction of the rectangular track rail 4 is obliquely cut. In other words, the auxiliary sliding surfaces 5 are inclined with respect to the ball rolling surfaces 41. Further, the auxiliary sliding surfaces 5 are formed into such a shape that the end portion of the rectangular track rail 4 in the longitudinal direction is obliquely cut. Thus, the auxiliary sliding surfaces 5 become gradually wider as approaching to the longitudinal end surface 4a of the track rail 4.

Further, ball leading surfaces 43 are formed on end portions of the ball rolling surfaces 41 in the longitudinal direction. Those ball leading surfaces 43 are formed by performing a crowning process on the end portions of the ball rolling surfaces 41 so that an interval between the moving block 2 and the ball rolling surfaces 41 becomes gradually larger as approaching to the end portions of the track rail 4. Further, those ball leading surfaces 43 are formed on the end portions of the ball rolling surfaces 41 in the longitudinal direction, and hence are adjacent to the auxiliary sliding surfaces 5. In addition, those ball leading surfaces 43 are formed so as to allow the moving block 2 to smoothly pass across the joint clearances 7. In other words, in a case where the ball leading surfaces are formed, when the moving block 2 passes across the joint clearances 7, loads to be applied to the balls 3 interposed between the moving block 2 and the track rail 4 are gradually reduced, and then gradually increased. Note that, the ball leading surfaces 43 are not essential to the invention of the present application. However, when those surfaces are formed on the track rails 4 in advance, the balls 3 are allowed to more smoothly pass across the joint clearances between the track rails 4.

Meanwhile, as illustrated in FIG. 2, the moving block 2 is mounted to the track rail 4 through intermediation of the large number of balls 3 configured to be endlessly circulated. The balls 3 roll on the ball rolling surfaces 41 of the track rail 4 so as to allow the moving block 2 to be freely movable along the track rail 4. In this case, the balls 3 correspond to contact elements of the present invention. The moving block 2 includes a block body 20 and a pair of lid members 21 fixed to both end surfaces of the block body 20 in a moving direction.

Load ball rolling surfaces 22 are formed in two rows in the block body 20, and those load ball rolling surfaces 22 are formed at positions of facing the ball rolling surfaces 41 of the track rail 4. When those load ball rolling surfaces 22 and the ball rolling surfaces 41 face each other, a load ball path that allows the balls 3 to roll between the track rail 4 and the block body 20 while bearing the loads is completed. Further, this block body 20 includes ball return paths 23 in two rows formed substantially parallel to the load ball rolling surfaces 22, and the balls 3 roll through the ball return paths 23 under a load-free state.

Meanwhile, direction converting paths (not shown) configured to couple the load ball rolling surfaces 22 and the ball return paths 23 to each other are formed in the lid member 21 so that the balls 3 can be reciprocated between the load ball paths and the ball return paths 23. Thus, when the pair of lid members 21 are fixed to a front and a back of the block body 20 in the moving direction, end portions of the load ball paths and the ball return paths are coupled to each other through the direction converting paths in the lid members. With this, endless circulation paths for the balls are completed in the moving blocks. Note that, in the example illustrated in FIG. 2, the moving block includes endless circulation paths in two rows, but the number of the endless circulation paths may be appropriately set and changed in accordance with magnitude of a load to be borne by the moving block.

The lid member 21 is made of a synthetic resin. Further, this lid member 21 is kept out of contact with the track rail 4 through a slight clearance under the state in which the balls 3 bear the loads between the ball rolling surfaces 41 of the track rail 4 and the load ball rolling surfaces 22 of the block body 20. An opposed surface of the lid member 21 with respect to the track rail 4 corresponds to the leading sliding portion 9 of the present invention.

Further, a retaining plate 30 is arranged between the moving block 2 and the track rail 4, and both end portions of the retaining plate 30 in the longitudinal direction are supported by the lid members 21. The retaining plate 30 has a pair of slit-like retaining holes 31 corresponding to the ball endless circulation paths formed in the moving block 2. The balls 3 rolling on the load ball rolling surfaces 22 of the block body 20 are held in contact with the ball rolling surfaces 41 of the track rail 4 through the retaining holes 31. Further, a width of the retaining holes 31 is set to be slightly smaller than a diameter of the balls 3 so that, even when the moving block 2 is removed from the track rail 4, the balls 3 do not drop off the moving block 2.

Note that, for the sake of better understanding of the circulation paths for the balls 3 in the moving block 2, in the illustration of FIG. 2, the moving block 2 is half cut.

Figure 4:
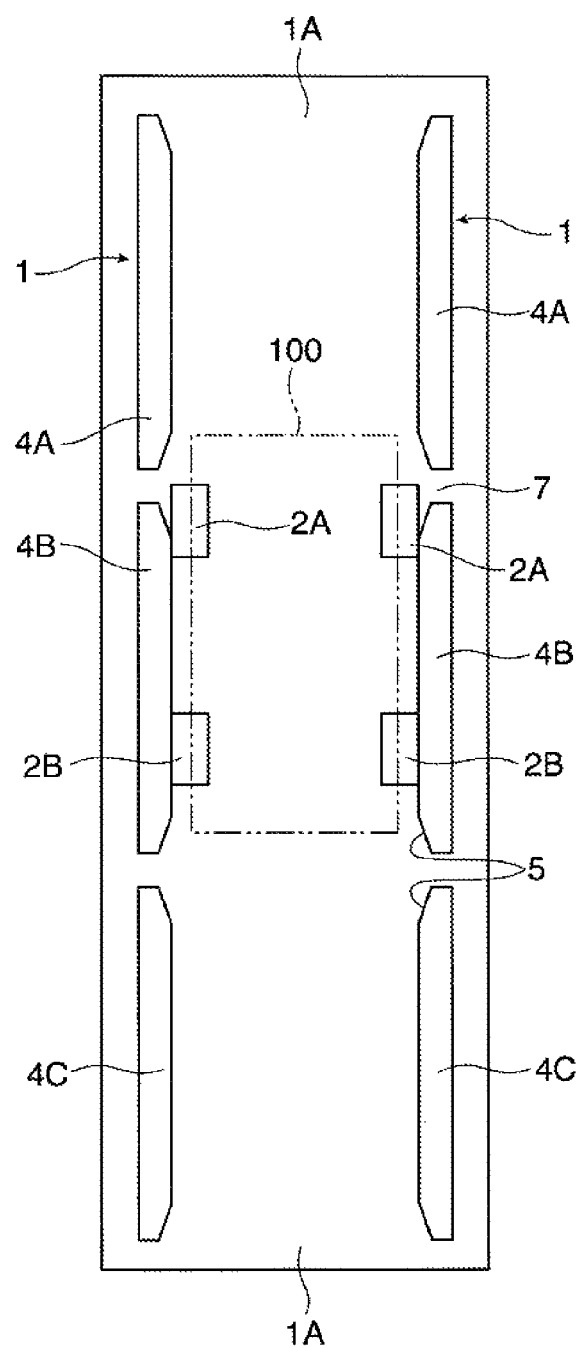
FIG. 4 is a schematic view for illustrating a use example of the support and guide device according to the first embodiment.

FIG. 4 is a schematic view for illustrating a specific use example of the support and guide device described with reference to FIG. 2 and FIG. 3. In this use example, the guide tracks 1 are arranged parallel to each other in pairs on the fixed portion 1A. Along each of the guide tracks 1, a plurality of moving blocks 2A and 2B are mounted at intervals from each other, and the moving blocks 2A and 2B are fixed to a movable body 100. With this, the moving blocks 2A and 2B individually bear a load of the movable body 100, and hence the movable body 100 is movable along the guide tracks 1 while being supported with respect to the fixed portion 1A.

The guide tracks 1 each include a plurality of track rails 4A to 4C arranged in series, and the joint clearances 7 are secured between the end portions of the track rails adjacent to each other in a front and a back of the movable body 100 in the moving direction. In this use example, a size of each of the joint clearances 7 is approximately 10 mm. Meanwhile, the diameter of the balls arranged in each of the moving blocks 2A and 2B is approximately 2.4 mm. Therefore, the joint clearances 7 are each four times or more as large as the ball 4. Thus, for example, when the moving block 2A fixed to the movable body 100 shifts from the track rail 4B to the track rail 4A, the balls 3 that have rolled on ball rolling surfaces 41 of the track rail 4B enter a non-load state before shifting onto ball rolling surfaces of the track rail 4A.

When the balls 3 enter the non-load state in the joint clearance 7, the moving block 2A that has borne a part of the load of the movable body 100 may be displaced from the track rail 4A in the joint clearance 7. When such an accident occurs, trains of the balls 3 arranged in the moving block 2A fail to accurately correspond to the ball rolling surfaces 41 of the track rail 4A located forward in the moving direction. As a result, the balls 3 are caught when the moving block 2A shifts from the track rail 4B to the track rail 4A, which may hinder the movable body 100 from being smoothly moved along the guide track 1.

Figure 5:
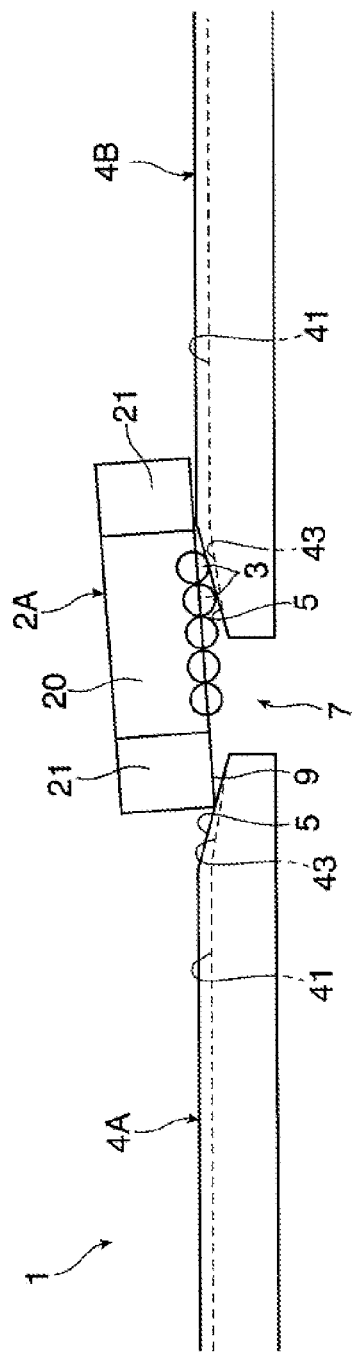
FIG. 5 is a schematic view for exemplifying a state of a joint clearance in the support and guide device according to the first embodiment.

Meanwhile, in the support and guide device according to this embodiment, as illustrated in FIG. 5, when the moving block 2A reaches the joint clearance 7 along with the movement of the movable body 100, the balls 3 enter the non-load state, with the result that the moving block 2A is displaced from the track rails 4A and 4B. Then, the lid member 21, which is located at a front end of the moving block 2A in the moving direction, comes into contact with the auxiliary sliding surfaces 5 of the track rail 4A. More specifically, an opposed surface of the lid member 21 with respect to the track rail 4, in other words, the above-mentioned leading sliding portion 9 comes into contact with the auxiliary sliding surfaces 5 of the track rail 4A.

Note that, the auxiliary sliding surfaces 5 are formed to be inclined with respect to a forward direction of the moving block 2A, in other words, inclined with respect to the ball rolling surface 41. Thus, when the movable body 100 is moved along the guide tracks 1, and the leading sliding portion 9 of the lid member 21 comes into sliding contact with the auxiliary sliding surfaces 5, the displacement of the moving block 2A from the track rail 4B is gradually reduced. As a result, the displacement between the ball trains in the moving block 2A and the ball rolling surfaces 41 of the track rail 4A is gradually eliminated. With this, the balls 3, which have been temporarily kept in the non-load state in the joint clearance 7, can be smoothly shifted onto the ball rolling surfaces 41 of the track rail 4A without being caught by a corner portion of the track rail 4A. Thus, the moving block 2A can be moved along the guide tracks 1 while smoothly passing across the joint clearances.

Further, in the support and guide device according to the first embodiment, the ball leading surfaces 43 are formed on the end portions of the ball rolling surfaces of each of the track rails in the longitudinal direction, and the ball leading surfaces 43 are inclined so that the interval between the moving block 2 and the track rails 4 becomes gradually larger as approaching to the end portions of the track rails 4. Thus, at the time when the balls 3, which have been temporarily kept in the non-load state in the joint clearances 7, are shifted onto the ball rolling surfaces 41 of the track rail 4A, the balls 3 are not directly shifted onto the ball rolling surfaces 41 and bear the loads, but first come into contact with the ball leading surfaces 43 formed on a near side with respect to the ball rolling surfaces 41. With this, the loads to be borne by the balls 3 are gradually increased as the balls 3 advance along the ball leading surfaces 43. Then, the balls 3 enter the ball rolling surfaces 41 through the ball leading surfaces 43. In this way, shift of the moving block 2A from the track rail 4B to the track rail 4A is completed. In other words, in the support and guide device according to the first embodiment, the ball leading surfaces 43 formed on the end portions of the ball rolling surfaces 41 in the longitudinal direction allow the moving block 2A to be more smoothly shifted from the track rail 4B to the track rail 4A, thereby being capable of smoothly guiding the movable body 100 over an entire region on the guide tracks 1.

Note that, for the sake of better understanding of functions and effects of the present invention, in FIG. 5, the displacement of the moving block 2A is illustrated on an exaggerated scale.

Figure 6:
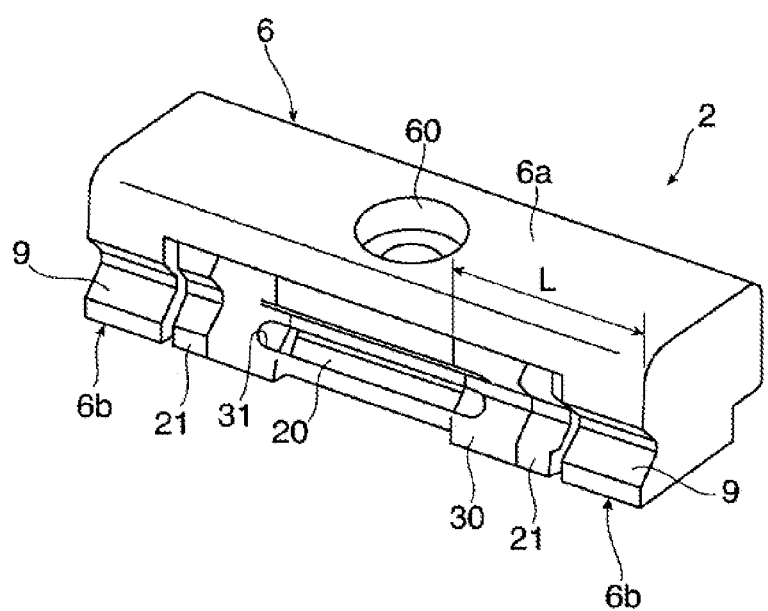
FIG. 6 is a perspective view for illustrating a support and guide device according to a second embodiment to which the present invention is applied, specifically, for illustrating a moving block according to the second embodiment.

Next, FIG. 6 is a view for illustrating a support and guide device according to a second embodiment to which the present invention is applied, specifically, for illustrating another example of the moving block that can be used in a combination with the track rail 4 according to the first embodiment.

In the configuration of the first embodiment described above, at the time when the moving block 2 passes across the joint clearance 7, the lid member 21 as a part of the moving block 2 is held in sliding contact with the auxiliary sliding surfaces 5 of the track rail 4A. In other words, the leading sliding portion 9 of the present invention is formed directly with respect to the lid member 21, and the leading sliding portion 9 has a function to restore the displaced moving block 2 to an original state by being held in sliding contact with the auxiliary sliding surfaces 5. Thus, at the time when the moving block 2 passes across the joint clearance 7, an external force is applied to the lid member 21.

However, parts of the endless circulation paths for the balls 3 are formed in the lid member 21. Thus, when the lid member 21 is displaced from the block body 20 as a result of the application of the external force to the lid member 21, the balls 3 may be hindered from being smoothly circulated through the moving block 2. Further, the lid members 21 support the retaining plate 30 from both sides of the block body 20. Thus, when the external force is applied to the lid members 21, the retaining plate 30 may be deformed. In such a case, the slit-like retaining holes 31 formed through the retaining plate 30 may be expanded. Thus, in the joint clearance 7, the rolling balls 3 may drop off the moving block 2 through the retaining holes 31.

As a countermeasure, in the support and guide device according to the second embodiment, as illustrated in FIG. 6, the moving block 2 includes an auxiliary sliding member 6. This auxiliary sliding member 6 is fixed to the block body 20. Further, this auxiliary sliding member 6 comes into sliding contact with the auxiliary sliding surfaces 5 instead of the lid members 21. This auxiliary sliding member 6 includes a horizontal portion 6a to be fixed to the block body 20, and a pair of leg portions 6b projected from this horizontal portion 6a so as to cover a front and a back of the lid members 21 in the moving direction. A mounting hole 60 is formed through the horizontal portion 6a so that a fixing bolt is inserted into the mounting hole 60. With this, the auxiliary sliding member 6 and the block body 20 can be collectively fixed to the movable body 100. Note that, the same components as those in the first embodiment described above are denoted by the same reference symbols as those in the first embodiment, and detailed description thereof is omitted.

Meanwhile, the leg portions 6b are adjacent to the lid members 21, and the block body 20 and the pair of lid members 21 are accommodated between the pair of leg portions 6b. Further, clearances are secured between the leg portions 6b and adjacent ones of the lid members 21. An opposed surface of each of the leg portions 6b with respect to the track rail 4 is formed into the same shape as that of each of the lid members 21 so that, under the state in which the balls 3 in the moving block 2 are held in contact with the ball rolling surfaces 41 of the track rail 4, the leg portions 6b are kept out of contact with the track rail. Thus, the opposed surface of each of the leg portions 6b with respect to the track rail 4 corresponds to the leading sliding portion 9 of the present invention. As illustrated in FIG. 6, a distance L from the end surface of the block body 20 to an end surface of the auxiliary sliding member 6 is set to be larger than each of the joint clearances 7 between the track rails 4 forming the guide tracks 1.

Figure 7:
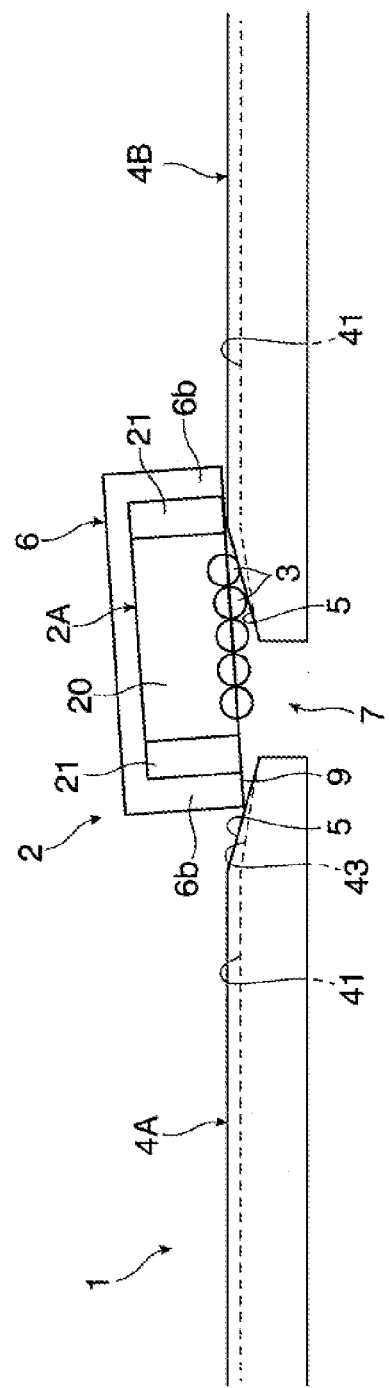
FIG. 7 is a schematic view for exemplifying a state of a joint clearance in the support and guide device according to the second embodiment.

FIG. 7 is a schematic view corresponding to FIG. 5 of the first embodiment, for illustrating a state in which the moving block 2 having the auxiliary sliding member 6 mounted thereto passes across the joint clearance 7 between the track rail 4A and the track rail 4B.

As described above, the distance L from the end surface of the block body 20 to the end surface of the auxiliary sliding member 6 is set to be larger than each of the joint clearances 7. Thus, at a time when the balls 3 in the moving block 2 leave the track rail 4B and enter the joint clearance 7, the leg portion 6b of the auxiliary sliding member 6 has already reached the track rail 4A located forward in the moving direction. Thus, as illustrated in FIG. 7, when the moving block 2A reaches the joint clearance 7, the balls 3 enter the non-load state to cause the moving block 2A to be displaced from the track rails 4A and 4B. As a result, the leg portion 6b comes into contact with the auxiliary sliding surfaces 5 of the track rail 4A. In other words, the leading sliding portion 9 of the leg portion 6b comes into contact with the auxiliary sliding surfaces 5. Further, also in the second embodiment, when the movable body 100 is moved along the guide tracks 1 to bring the leading sliding portion 9 of the auxiliary sliding member 6 into sliding contact with the auxiliary sliding surfaces 5, the displacement of the moving block 2A from the track rail 4B is gradually reduced. As a result, the displacement between the ball trains in the moving block 2A and the ball rolling surfaces 41 of the track rail 4A is gradually eliminated. With this, the balls 3, which have been temporarily kept in the non-load state, can be smoothly shifted onto the ball rolling surfaces 41 of the track rail 4A without being caught by the corner portion of the track rail 4A. Thus, the moving block 2A is movable along the guide tracks 1 while smoothly passing across the joint clearances 7.

In this case, the auxiliary sliding member 6 is fixed together with the block body 20 to the movable body 100. In addition, the clearances are secured between the leg portions 6b of the auxiliary sliding member 6 and the adjacent ones of the lid members 21. Thus, even when the leading sliding portions 9 of the leg portions 6b come into sliding contact with the auxiliary sliding surfaces 5 of the track rail 4A, the external force is not applied to the lid members 21. In other words, the auxiliary sliding member 6 has a function to protect the lid members 21 in the joint clearances 7. Thus, the lid members 21 can be prevented from being displaced from the block body 20, and in addition, the retaining plate 30 supported by the lid members 21 is not deformed. As a result, the movable body 100 can be smoothly guided along the guide tracks 1 without impairing traveling performance of the moving block 2 with respect to the track rails 4.

Figure 8:
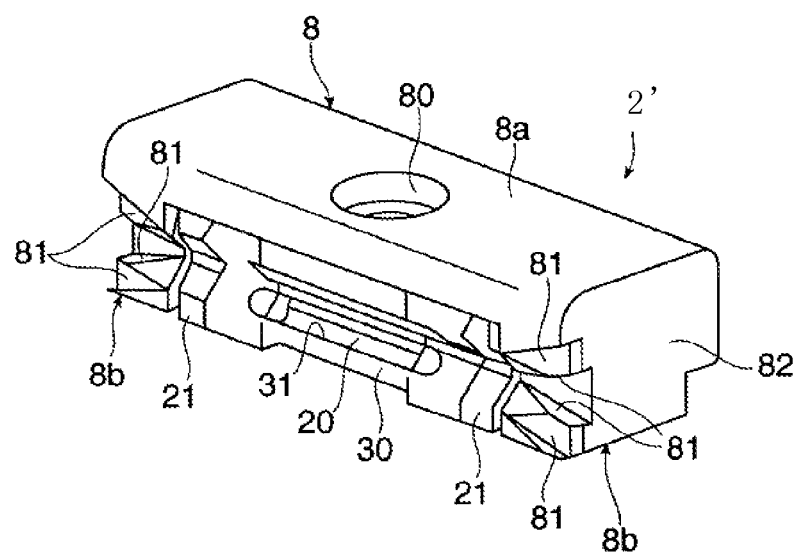
FIG. 8 is a perspective view for illustrating a support and guide device according to a third embodiment to which the present invention is applied, specifically, for illustrating a moving block according to the third embodiment.

Next, FIG. 8 is a perspective view for illustrating a support and guide device according to a third embodiment to which the present invention is applied, specifically, for illustrating a moving block 2' of the support and guide device.

In the first embodiment and the second embodiment described above, the auxiliary sliding surfaces 5 of the present invention are formed on the end portions of each of the track rails 4 in the longitudinal direction, and the moving blocks 2 each include the leading sliding portions. However, in the third embodiment, the auxiliary sliding surfaces 5 are formed not on the track rails 4, but on each of the moving blocks 2'. Note that, the same components as those in the first embodiment described above are denoted by the same reference symbols as those in the first embodiment, and detailed description thereof is omitted.

As illustrated in FIG. 8, the moving block 2' according to the third embodiment includes an auxiliary guide member 8 fixed to the block body 20. This auxiliary guide member 8 includes a horizontal portion 8a to be fixed to the block body 20, and a pair of leg portions 8b projected from this horizontal portion 8a so as to cover the lid members 21 from the front and the back in the moving direction. A mounting hole 80 is formed through the horizontal portion 8a so that a fixing bolt is inserted into the mounting hole 80. With this, the auxiliary guide member 8 and the block body 20 can be collectively fixed to the movable body 100. Further, the leg portions 8b are adjacent to the lid members 21, and the block body 20 and the pair of lid members 21 are accommodated between the pair of leg portions 8b. Further, clearances are secured between the leg portions 8b and adjacent ones of the lid members 21.

Under the state in which the balls 3 are held in contact with ball rolling surfaces 41 of the track rail 4, an opposed surface of each of the leg portions 8b with respect to the track rail 4 is kept out of contact with the track rail 4. Further, the leg portions 8b each have two pairs of auxiliary sliding surfaces 81 that are formed in such a manner as to sandwich positions of facing the ball rolling surfaces 41 in two rows of the track rail 4. Those auxiliary sliding surfaces 81 are formed over a predetermined distance from an outer end surface 82 of each of the leg portions 8b into such a shape that the opposed surface of each of the leg portions 8b with respect to the track rail 4 is obliquely cut. In other words, the auxiliary sliding surfaces 81 are inclined with respect to the ball rolling surfaces 41 of the track rail 4. Further, the auxiliary sliding surfaces 81 become gradually wider as approaching to the outer end surface 82 of each of the leg portions 8b.

Meanwhile, although not shown, the track rail according to the third embodiment is formed into such a shape that the auxiliary sliding surfaces 5 formed on the end portions of the track rail 4 according to the first embodiment are omitted. As a matter of course, the ball leading surfaces 43 of the track rail 4 according to the first embodiment may be arbitrarily formed.

FIG. 9 is a schematic view corresponding to FIG. 5 of the first embodiment, for illustrating a state in which the moving block 2' having the auxiliary guide member 8 mounted thereto passes across the joint clearance 7 between the track rail 4A and the track rail 4B. Note that, as already described above, the auxiliary sliding surfaces are not formed on the end portions of each of the track rails 4A and 4B in the longitudinal direction. An opposed surface of each of the track rails 4A and 4B with respect to the moving block 2' intersects at a right angle with the end surface 4a of corresponding one of the track rails 4A and 4B so as to form a corner portion 44.

As illustrated in FIG. 9, when the moving block 2' reaches the joint clearance 7, the balls 3 enter the non-load state to cause the moving block 2' to be displaced from the track rails 4A and 4B. As a result, one of the leg portions 8b of the auxiliary guide member 8, which is located at a front end of the moving block 2' in a moving direction thereof, comes into contact with the corner portion 44 of the track rail 4A. In other words, the auxiliary sliding surfaces 81 to face the track rail 4A come into contact with the corner portion 44. Further, as described above, the auxiliary sliding surfaces 81 are inclined with respect to the longitudinal direction of the track rail, in other words, an extending direction of the ball rolling surfaces 41. Thus, when the movable body 100 is moved along the guide tracks 1 to bring the auxiliary sliding surfaces 81 of the auxiliary guide member 8 into sliding contact with the corner portion 44 of the track rail 4A, the displacement of the moving block 2' from the track rail 4B is gradually reduced. As a result, the displacement between the ball trains in the moving block 2' and the ball rolling surfaces 41 of the track rail 4A is gradually eliminated. With this, the balls 3, which have been temporarily kept in the non-load state, can be smoothly shifted onto the ball rolling surfaces 41 of the track rail 4A without being caught by the corner portion 44 of the track rail 4A. Thus, the moving block 2' can be moved along the guide tracks 1 while smoothly passing across the joint clearances 7. In other words, in the third embodiment, the corner portion 44 of the track rail 4A functions as the leading sliding portion of the present invention.

Therefore, in the present invention, there are no problems as long as the auxiliary sliding surfaces are formed on any one of the moving block and the track rail, and as long as the members to face the auxiliary sliding surfaces include the leading sliding portions configured to restore, cooperatively with those auxiliary sliding surfaces, the moving block displaced in the joint clearance.

Note that, in the support and guide device according to the third embodiment, the moving block 2' need not necessarily include the auxiliary guide member 8, and the auxiliary sliding surfaces 81 may be formed directly on the lid members 21. Note that, when the auxiliary sliding surfaces 81 are formed directly on the lid members 21, as in the first embodiment described above, the lid members 21 may be displaced from the block body 20. From such viewpoints, it is preferred that, as described in the third embodiment, the auxiliary guide member 8 be provided so that the lid members 21 are protected with the auxiliary guide member 8.

Further, in the support and guide device according to the third embodiment, the auxiliary sliding surfaces 81 of the auxiliary guide member 8 do not face the ball rolling surfaces 41 of the track rail 4, and the auxiliary sliding surfaces 81 are configured to be held in sliding contact with parts other than the ball rolling surfaces 41 of the track rail 4. However, the auxiliary sliding surfaces 81 may be formed at the positions of facing the ball rolling surfaces 41 of the track rail 4 so that, when the moving block is displaced in the joint clearance 7, the auxiliary sliding surfaces 81 come into contact with the ball rolling surfaces 41 of the track rail 4. Also with such a configuration, the displacement of the moving block in the joint clearance 7 can be gradually eliminated. With this, the moving block can be reliably and smoothly moved along the guide tracks.

In the support and guide devices according to the embodiments described above, the ball rolling surfaces are formed only on one lateral surface of each of the track rails, and the moving blocks having the endless circulation paths for the balls are mounted to the lateral surface of each of the track rails. However, the support and guide device of the present invention is not limited thereto. For example, the present invention is applicable also to a support and guide device of such a type that the ball rolling surfaces are formed on both lateral surfaces of each of the track rails, and that the moving blocks are mounted astride to the track rails.

Further, the support and guide device to which the present invention is applied is not limited to such a type that moving blocks thereof each include endless circulation paths for rolling elements such as balls and rollers, and is applicable also to support and guide devices, for example, of such a type that the moving blocks configured to slide on the track rails each include low-friction sliding contact members as contact elements, or such a type that the moving blocks configured to travel on the track rails each include pivotally supported wheels.

Still further, the support and guide device to which the present invention is applied is not limited to such a type that the track rails are each formed into a straight shape, and is applicable also to such a type that the track rails are each formed into a circular-arc shape so that the moving blocks are guided in a curved form along the track rails. Yet further, the support and guide device is applicable also to such a type that the track rails include straight portions and curved portions in combinations.

The invention claimed is:

1. A support and guide device, comprising:
   a plurality of track rails arranged in series so as to form a guide track; and
   a moving block configured to travel along the guide track,
   wherein each of the plurality of track rails has a guide surface formed along a longitudinal direction of the each of the plurality of track rails,
   wherein the moving block comprises contact elements configured to travel on the guide surface of the each of the plurality of track rails,
   wherein the each of the plurality of track rails has auxiliary sliding surfaces formed on both end portions of the each of the plurality of track rails in the longitudinal direction, the auxiliary sliding surfaces being formed side by side with the guide surface and being inclined with respect to the guide surface, and wherein the moving block comprises leading sliding portions each configured to face one of the auxiliary sliding surfaces of the each of the plurality of track rails when the moving block reaches one of the end portions of the each of the plurality of track rails in the longitudinal direction.

2. The support and guide device according to claim 1, wherein the moving block comprises:

a block body;

a pair of lid members comprising a first lid member fixed to a first end of the block body and a second lid member fixed to a second end of the block body; and an endless circulation path through which a plurality of balls as the contact elements are circulated, and wherein each of the leading sliding portions is formed on a surface of each of the pair of lid members on one side, which faces the plurality of track rails.

3. The support and guide device according to claim 2, wherein the guide surface of the each of the plurality of track rails comprises ball leading surfaces formed on both ends of the guide surface in the longitudinal direction by a crowning process performed on end portions of the guide surface.

4. The support and guide device according to claim 1, wherein the moving block comprises:

a block body;

a pair of lid members comprising a first lid member fixed to a first end of the block body and a second lid member fixed to a second end of the block body;

an auxiliary sliding member fixed to the block body and configured to cover the pair of lid members from a front and a back of the pair of lid members in a moving direction of the moving block across a joint clearance; and an endless circulation path through which a plurality of balls as the contact elements are circulated, and wherein the leading sliding portions are respectively formed on surfaces of the auxiliary sliding member on one side, which faces the plurality of track rails.

5. The support and guide device according to claim 4, wherein the guide surface of the each of the plurality of track rails comprises ball leading surfaces formed on both ends of the guide surface in the longitudinal direction by a crowning process performed on end portions of the guide surface.

6. A support and guide device, comprising:

a plurality of track rails arranged in series so as to form a guide track; and a moving block configured to travel along the guide track, wherein each of the plurality of track rails has a guide surface formed along a longitudinal direction of the each of the plurality of track rails, wherein the moving block comprises contact elements configured to travel on the guide surface of the each of the plurality of track rails, wherein the moving block has auxiliary sliding surfaces formed on both end portions of the moving block in the longitudinal direction, the auxiliary sliding surfaces being inclined with respect to the guide surface of the each of the plurality of track rails, and wherein the each of the plurality of track rails comprises leading sliding portions each configured to face one of the auxiliary sliding surfaces of the moving block when the moving block reaches one of the end portions of the each of the plurality of track rails in the longitudinal direction.

7. The support and guide device according to claim 6, wherein the moving block comprises:

a block body;

a pair of lid members comprising a first lid member fixed to a first end of the block body and a second lid member fixed to a second end of the block body;

an auxiliary guide member fixed to the block body and configured to cover the pair of lid members from a front and a back of the pair of lid members in a moving direction of the moving block across a joint clearance; and an endless circulation path through which a plurality of balls as the contact elements are circulated, and wherein the leading sliding portions are respectively formed on surfaces of the auxiliary guide member on one side, which faces the plurality of track rails.

* * * * *